United States Patent
Mohammed et al.

(10) Patent No.: US 12,339,819 B2
(45) Date of Patent: Jun. 24, 2025

(54) AUTOMATED VALIDATION OF DATABASE DEPLOYMENTS

(71) Applicant: Dell Products L.P., Round Rock, TX (US)

(72) Inventors: Jahangeer Pasha Mohammed, Milton (CA); Mohammadi Begum, Hyderabad (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/874,806

(22) Filed: Jul. 27, 2022

(65) Prior Publication Data

US 2024/0037079 A1  Feb. 1, 2024

(51) Int. Cl.
*G06F 16/00* (2019.01)
*G06F 8/60* (2018.01)
*G06F 16/21* (2019.01)
*G06F 16/242* (2019.01)

(52) U.S. Cl.
CPC .............. *G06F 16/217* (2019.01); *G06F 8/60* (2013.01); *G06F 16/242* (2019.01)

(58) Field of Classification Search
None
See application file for complete search history.

(56) References Cited

U.S. PATENT DOCUMENTS

| | | | |
|---|---|---|---|
| 6,985,901 B1 | 1/2006 | Sachse | |
| 9,547,675 B2* | 1/2017 | Bostock | G06F 16/25 |
| 9,582,606 B2* | 2/2017 | Pitschke | G06F 16/84 |
| 10,061,678 B2* | 8/2018 | Jovanović | G06F 11/3409 |
| 10,776,330 B2* | 9/2020 | Bregler | G06F 16/217 |
| 11,301,451 B1* | 4/2022 | Cseri | G06F 16/2456 |

(Continued)

OTHER PUBLICATIONS

SQL Change Automation 4 Documentation, Pre-deployment and post-deployment scripts, Red Gate Software Ltd, available at: https://documentation.red-gate.com/sca/developing-databases/concepts/migrations/pre-deployment-and-post-deployment-scripts (last accessed Apr. 21, 2022), last updated Dec. 14, 2020.

(Continued)

*Primary Examiner* — Farhan M Syed
(74) *Attorney, Agent, or Firm* — Ryan, Mason & Lewis, LLP

(57) ABSTRACT

Methods, apparatus, and processor-readable storage media for automated validation of database deployments are provided herein. An example computer-implemented method includes obtaining database scripts to be executed on at least one database, wherein each database script is associated with one or more database objects; parsing respective ones of the database scripts to identify object information corresponding to the one or more database objects associated with the corresponding database script; automatically generating a validation script comprising one or more validation queries for respective ones of the one or more database objects associated with a corresponding one of the database scripts, wherein each validation query is based at least in part on the identified object information of the corresponding database object; and initiating an execution of the validation script to validate one or more changes of the at least one database resulting from an execution of the database scripts.

20 Claims, 11 Drawing Sheets

(56) References Cited

U.S. PATENT DOCUMENTS

| | | | |
|---|---|---|---|
| 2001/0049682 | A1 | 12/2001 | Vincent |
| 2004/0249830 | A1 | 12/2004 | Sonkin |
| 2007/0055693 | A1 | 3/2007 | Galbraith et al. |
| 2015/0019497 | A1* | 1/2015 | Bostock .............. G06F 16/2365 707/687 |
| 2015/0149421 | A1* | 5/2015 | Foebel .................. G06F 16/951 707/690 |
| 2015/0161181 | A1* | 6/2015 | Doms .................... G06F 16/213 707/697 |
| 2016/0036858 | A1* | 2/2016 | Chieu ..................... H04L 63/20 726/1 |
| 2016/0292210 | A1* | 10/2016 | Panse ................ G06F 16/24565 |
| 2016/0378634 | A1* | 12/2016 | Jovanovic ........... G06F 11/3409 707/688 |
| 2017/0019314 | A1* | 1/2017 | Chieu ................. H04L 41/5045 |
| 2017/0068692 | A1* | 3/2017 | Bostock .............. G06F 11/079 |
| 2017/0103100 | A1* | 4/2017 | Sharma .............. G06F 11/1448 |
| 2017/0180205 | A1* | 6/2017 | Baset ................. G06F 11/3684 |
| 2018/0210910 | A1* | 7/2018 | Collins ............. G06F 16/24524 |
| 2019/0005074 | A1* | 1/2019 | Bregler ................ G06F 16/9024 |
| 2019/0026320 | A1* | 1/2019 | Sharma ................. G06F 16/212 |
| 2019/0179934 | A1* | 6/2019 | Gogineni ............ G06F 3/04842 |
| 2019/0196890 | A1* | 6/2019 | Bucchi .................. G06F 16/951 |
| 2019/0384847 | A1 | 12/2019 | Bobbala et al. |
| 2020/0334244 | A1* | 10/2020 | Hammerschmidt .... G06F 16/86 |
| 2021/0034474 | A1 | 2/2021 | Khandkar |
| 2021/0182248 | A1* | 6/2021 | Jayanthi ............. G06F 9/45558 |
| 2022/0137937 | A1* | 5/2022 | Saha ........................ G06F 8/36 717/115 |
| 2023/0281173 | A1* | 9/2023 | Jaisawal ............. G06F 16/2358 707/692 |

OTHER PUBLICATIONS

Walker, Bob, available at: https://octopus.com/blog/dbup-database-deployment-automation (last accessed Apr. 21, 2022), Mar. 24, 2020.

Mohammed, Jahangeer Pasha et al., "Automatic Sequencing of Database Objects," U.S. Appl. No. 17/725,968, filed Apr. 21, 2022.

* cited by examiner

```
CREATE TABLE GSP_GLOBAL_ACCOUNT.GCS_ACCOUNT_SEQUENCE_DAT
(
    SLNO                NUMBER GENERATED ALWAYS AS IDENTITY,
    CUST_ACCOUNT_ID     VARCHAR2 (4 CHAR),
    LASTPROJID          VARCHAR2 (50 CHAR),
    R_DATE              DATE                                    DEFAULT SYSDATE,
    REGION              VARCHAR2(4 CHAR),
    D2_VALUE            NUMBER                                  DEFAULT 10
)

CREATE INDEX GSPOWNER_GLOBAL_ACCOUNT.PK_SLNO ON
GSPOWNER_GLOBAL_ACCOUNT.GCS_ACCOUNT_SEQUENCE_DAT
(SLNO)
TABLESPACE GPT_GACC_DATA01;

ALTER TABLE GSPOWNER_GLOBAL_ACCOUNT.GCS_ACCOUNT_SEQUENCE_DAT_ADD (
    CONSTRAINT PK_SLNO
    PRIMARY KEY
    (SLNO)
    USING INDEX GSPOWNER_GLOBAL_ACCOUNT.PK_SLNO
    ENABLE VALIDATE)
```

- 302: CREATE TABLE block (SLNO through D2_VALUE)
- 304: CREATE INDEX block
- 306: ALTER TABLE block

Select count(*) from GSP_GLOBAL_ACCOUNT.GCS_ACCOUNT_SEQUENCE_DAT  } 402

Select * from sys.indexes where object_id IN (select object_id from sys.objects where name = 'GSP_GLOBAL_ACCOUNT.GCS_ACCOUNT_SEQUENCE_DAT")  } 404

Select constraint_name, c_name, index_name, constraint_type, search_condition, r_constraint_name r_name from USER_CONSTRAINTS where TABLE_NAME = 'GSP_GLOBAL_ACCOUNT.GCS_ACCOUNT_SEQUENCE_DAT'  } 406

```
Insert Into Test (Test Date, Testno, Examno, Serialno, Type, Hours)
Select S.Test_Date, E.Testno, S.Examno, S.Serialno, 'Non-Flight', (F. STARTED-F. ENDED) as Hours
From Semester S, TIME F, TESTPAPERS e
Where S.Testno = F.Testno And E.Testno = 1
```

FIG. 5

```
UPDATE Suppliers
SET supplier_id = 150,
    supplier_name = 'SupplierA'
    city = 'CityA'
WHERE supplier_name = 'SupplierB';
```

Select * from Suppliers where supplier_id = 150;

FIG. 8

AUTOMATED VALIDATION OF DATABASE DEPLOYMENTS

FIELD

The field relates generally to information processing systems, and more particularly to evaluating database deployments in such systems.

BACKGROUND

Database deployments involve executing one or more database scripts to make one or more changes to a target database. Validating such changes often requires more time than executing the database changes, which can lead to increased downtime of applications associated with the target database.

SUMMARY

Illustrative embodiments of the disclosure provide techniques for automated validation of database deployments. An exemplary computer-implemented method includes obtaining one or more database scripts to be executed on at least one database, wherein each database script is associated with one or more database objects; parsing respective ones of the one or more database scripts to identify object information corresponding to the one or more database objects associated with the corresponding database script; automatically generating a validation script comprising one or more validation queries for respective ones of the one or more database objects associated with a corresponding one of the one or more database scripts, wherein each validation query is based at least in part on the identified object information of the corresponding database object; and initiating an execution of the validation script to validate one or more changes of the at least one database resulting from an execution of the one or more database scripts.

Illustrative embodiments can provide significant advantages relative to conventional database validation techniques. For example, technical problems associated with validating database deployments are overcome in one or more embodiments by validating database changes that are to be applied during the database deployment to identify characteristics associated with database objects, and automatically generating one or more validation scripts based on the identified characteristics.

These and other illustrative embodiments described herein include, without limitation, methods, apparatus, systems, and computer program products comprising processor-readable storage media.

BRIEF DESCRIPTION OF THE DRAWINGS

FIG. 3 shows an example of database code comprising a create operation;

FIG. 4 shows an example of validation code comprising validation queries generated for the database code in FIG. 3 in an illustrative embodiment;

FIG. 5 shows an example of database code comprising an insert operation;

FIG. 7 shows an example of database code comprising an update operation;

FIG. 8 shows an example of a validation query generated for the database code in FIG. 7 in an illustrative embodiment;

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Users (e.g., developers) often create scripts (e.g., structured query language (SQL) scripts) to make changes to a target database as part of a database deployment. It is often necessary to validate the changes to the target database in order to avoid errors resulting from the changes. Conventional techniques for validating code deployments include manually reviewing each of the changes. This process may be time consuming and can cause increased downtime of applications associated with the target database.

Exemplary embodiments described herein include an automatic deployment validation process that identifies the changes being applied to a target database and generates validation scripts based on object characteristics (e.g., object names, order of objects, object type, and object operation).

Figure 1:
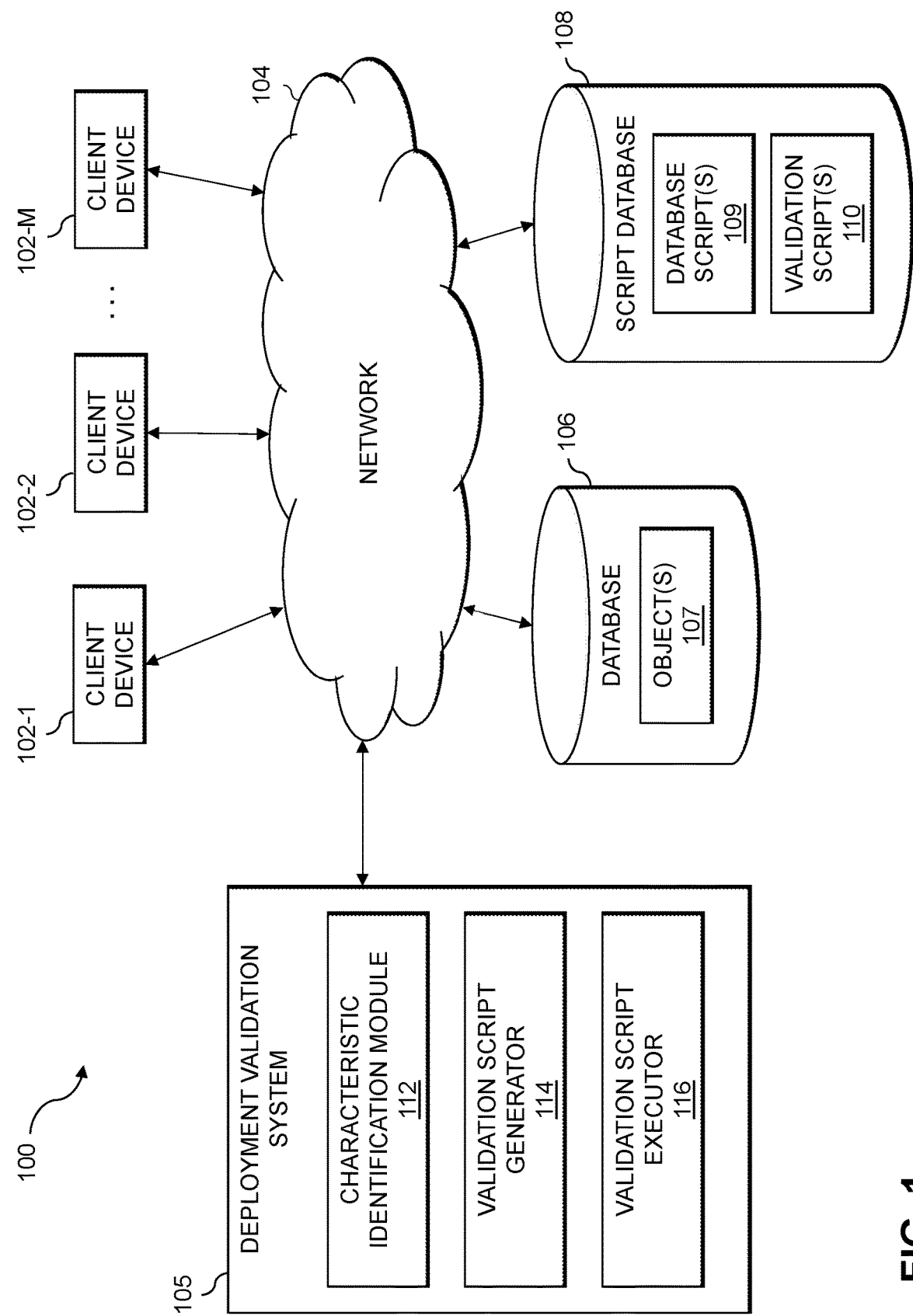
FIG. 1 shows an information processing system configured for automated validation of database deployments in an illustrative embodiment.

FIG. 1 shows a computer network (also referred to herein as an information processing system) 100 configured in accordance with an illustrative embodiment. The computer network 100 comprises a plurality of client devices 102-1, 102-2, . . . 102-M, collectively referred to herein as client devices 102. The client devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is a deployment validation system 105.

The client devices 102 may comprise, for example, servers and/or portions of one or more server systems, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The client devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (TP) or other related communication protocols.

Additionally, the deployment validation system 105 and/or client devices 102 can have at least one associated database 106 configured to store data pertaining to, for example, one or more database objects 107. In at least some embodiments, the deployment validation system 105 and/or client devices 102 can also have at least one associated script database 108 configured to store data pertaining to, for example, one or more database scripts 109 and/or one or more validation scripts 110. As an example, the one or more database scripts 109, in some embodiments, can be obtained from one or more of the client devices 102 for making changes to one or more of the database objects 107, and the one or more validation scripts 110 can be generated by the deployment validation system 105 for validating such changes.

An example database 106, such as depicted in the present embodiment, can be implemented using one or more storage systems associated with the deployment validation system 105 and/or the client devices 102. Such storage systems can comprise any of a variety of different types of storage including network-attached storage (NAS), storage area networks (SANs), direct-attached storage (DAS) and distributed DAS, as well as combinations of these and other storage types, including software-defined storage. The script database 108 can be implemented in a similar manner as described for database 106, for example.

Also associated with the deployment validation system 105 are one or more input-output devices, which illustratively comprise keyboards, displays or other types of input-output devices in any combination. Such input-output devices can be used, for example, to support one or more user interfaces to the deployment validation system 105, as well as to support communication between deployment validation system 105 and other related systems and devices not explicitly shown.

Additionally, the deployment validation system 105 in the FIG. 1 embodiment is assumed to be implemented using at least one processing device. Each such processing device generally comprises at least one processor and an associated memory, and implements one or more functional modules for controlling certain features of the deployment validation system 105.

More particularly, the deployment validation system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media. The network interface allows the deployment validation system 105 to communicate over the network 104 with the client devices 102, and illustratively comprises one or more conventional transceivers.

In the FIG. 1 embodiment, the deployment validation system 105 further comprises a characteristic identification module 112, a validation script generator 114, and a validation script executor 116.

The deployment validation system 105 obtains one or more of the database scripts 109 from the script database 108 (or possibly directly from one or more of the client devices 102) that are to be executed as part of a database deployment process with the database 106, for example. Generally, the characteristic identification module 112 parses the obtained database scripts 109 to identify changes to the database 106 that will result from execution of the database scripts 109. For example, the characteristic identification module 112 can parse at least some of the database scripts 109 to identify object characteristics, such as object type(s), object name(s), and object operation(s). The validation script generator 114 generates the validation scripts 110 based at least in part on the characteristics identified by the characteristic identification module 112. Following execution of the database scripts 109, the validation script executor 116 executes the validation scripts 110 to validate the database deployment.

It is to be appreciated that this particular arrangement of elements 112, 114 and 116 illustrated in the deployment validation system 105 of the FIG. 1 embodiment is presented by way of example only, and alternative arrangements can be used in other embodiments. For example, the functionality associated with the elements 112, 114 and 116 in other embodiments can be combined into a single module, or separated across a larger number of modules. As another example, multiple distinct processors can be used to implement different ones of the elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for deployment validation system 105 involving client devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, one or more of the deployment validation system 105, database 106, and script database 108 can be on and/or part of the same processing platform. Additionally, although the deployment validation system 105 is shown separate from the client devices 102, it is to be appreciated that, in at least some embodiments, the functionality associated with elements 112, 114, and 116 can be implemented at least in part by one or more of the client devices 102.

An exemplary process utilizing elements 112, 114 and 116 of an example deployment validation system 105 in computer network 100 will be described in more detail with reference to, for example, the flow diagrams of FIGS. 2 and 9.

Figure 2:
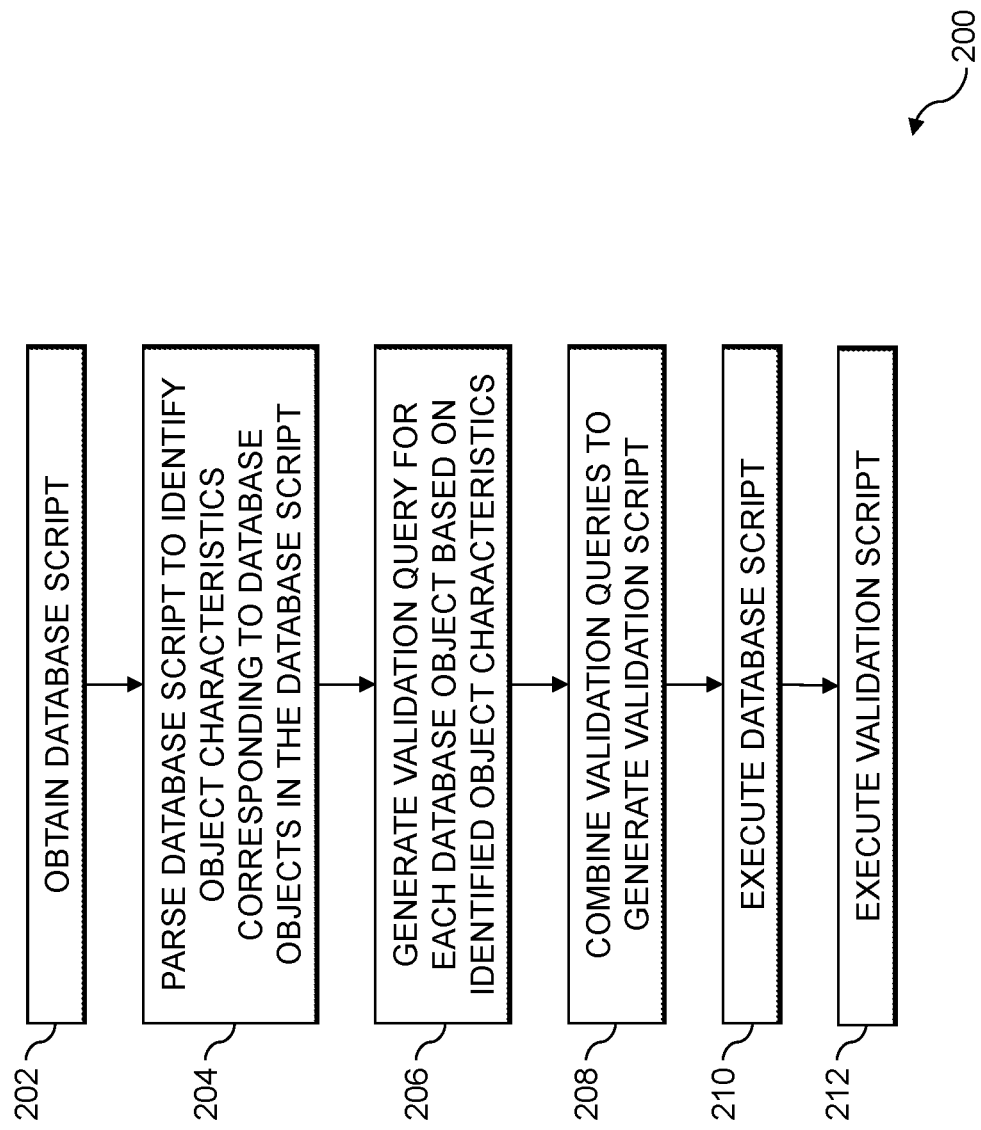
FIG. 2 shows a process flow diagram for automatically validating database deployments in an illustrative embodiment.

FIG. 2 shows a flow diagram of a process 200 in an illustrative embodiment. Step 202 includes obtaining a database script. It is assumed that the database script is associated with one or more types of database objects.

Step 204 includes parsing the database script to identify object characteristics corresponding to database objects in the database script. For example, the object characteristics can include object types, object names, object operations, and/or primary/foreign key constraints. In some embodiments, step 204 can identify the object characteristics in a similar manner as described in U.S. patent application Ser. No. 17/725,968, filed on Apr. 21, 2022, entitled "Automatic Sequencing of Database Objects," which is hereby incorporated by reference in its entirety. Step 204 may also include determining whether multiple object types are in the script, and if so, dividing the script into single object types (e.g., using a query block syntax).

The objects that do not exist in the target database (e.g., objects that have been deleted) can be parsed into data definition language (DDL) and/or data manipulation language (DML) operations based on a set of keywords. For example, the set of keywords may correspond to object types (e.g., TABLE, VIEW, etc.) and/or object operations (e.g., INSERT, UPDATE, DELETE, etc.). The operations can then be separated based on the type of operations (e.g., DDL and DML operations). The object names and operations can be dynamically parsed from the script and reference keys can be identified.

Step 206 includes generating a validation query for each object in the script based on the identified object characteristics, as described in more detail with reference to the examples shown in FIGS. 3-8, for example.

Step 208 includes combining the validation queries to generate a validation script. For example, a file including the script can be automatically created by adding each validation query into the file.

Step 210 includes executing the database script, which results in one or more changes in the target database.

Step 212 includes executing the validation script to validate the one or more changes resulting from step 210.

The process depicted in FIG. 2, in some embodiments, is performed for multiple scripts. By way of example, multiple scripts can be obtained at step 202, and steps 204-208 can be performed for each script (e.g., in a sequential manner). It is to be appreciated that the validation queries from multiple database scripts can be combined into a single validation script, or a separate validation script can be generated for each respective database script, in which case step 212 can include executing each of the validation scripts.

In some embodiments, a validation query can be created for a given object using the identified object characteristics. For example, if the operation associated with the object is identified as a create operation (e.g., based on the parsed object characteristics of step 204), then the corresponding validation query can be generated as a select query that includes the object name. Accordingly, the validation can be used to verify the existence of the created object.

FIG. 3 shows an example of database code 300 comprising create operations, and FIG. 4 shows an example of validation code 400 comprising validation queries 402, 404, and 406 that are generated for verifying the database code 300 in an illustrative embodiment. More specifically, the database code 300 comprises a create table operation 302, a create index operation 304, and an alter table operation 306.

The validation code 400 is created by identifying the object names and object types in the database code 300, and then generating select queries for each object operation in the database code 300. In particular, the validation queries 402, 404 and 406 are generated as select queries corresponding to the create table operation 302, the create index operation 304, and the alter table operation 306, respectively. As an example, the validation query 404 can be generated by identifying that the object type of the create index operation 304 is an INDEX object type. It is noted that an INDEX object type is a system datatype, and the validation query 404 can be generated based on the identified object type and the identified object name (GSP_GLOBAL_ACCOUNT.GCS_ACCOUNT_SEQUENCE_DAT).

Accordingly, the validation query 404 can be used to retrieve a matching record from the sys.indexes table to validate changes resulting from the create index operation 304. Similarly, the validation queries 402 and 406 can be used to validate changes in a target database resulting from the create table operation 302 and the alter table operation 306, respectively.

As another example, consider a scenario where the following command is executed as part of a database deployment: CREATE UNIQUE. INDIEX emp_emp_id_pk ON employees (employee_id). In at least one embodiment, the following query can be generated after the database deployment to validate the index, user, and group: select index_name from user_indexes where table_name='employees'.

Figure 6:
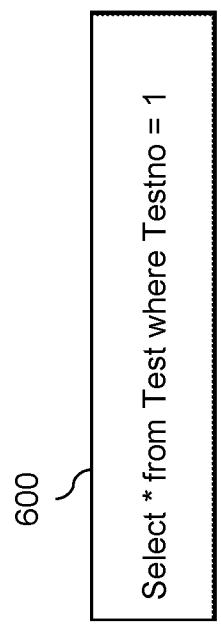
FIG. 6 shows an example of a validation query generated for the database code in FIG. 5 in an illustrative embodiment.

FIG. 5 shows an example of database code 500 comprising an insert operation. FIG. 6 shows an example of a validation query 600 generated for the database code 500 in an illustrative embodiment. More specifically, the validation query 600 can be created by parsing the database code 500 and identifying the object operation as an insert operation. The validation query 600 is created as a select query with the object name (which in this example is "Test") and a where clause is added to the validation query 600 by analyzing the insert query and finding key constraints (e.g., PRIMARY_KEY, FOREIGN_KEY) and/or other conditions. In this example, the where clause in the validation query 600 includes: Testno=1 based on analysis of the database code 500. Accordingly, the validation query 600 can be used to validate changes in a target database resulting from the database code 500.

FIG. 7 shows an example of database code 700 comprising an update operation. FIG. 8 shows an example of a validation query 800 generated for the database 700 in an illustrative embodiment. The validation query 800 can be created by parsing the database code 700 and identifying the object operation as an update operation. The validation query 800 is created as a select query with the object name (which in this example is "Suppliers") and a where clause is added to the validation query 800 by analyzing the update operation and finding conditions associated with the where clause in database code 700. Accordingly, the where clause in the validation query 800 includes supplier_id=150 to validate the changes in a target database resulting from the update operation in the database code 700.

In some embodiments, if a database script creates a sequence (e.g., ACCT_MANAGE_PRIV) as part of a database deployment, then the following select validation query can be generated to validate the sequence object: SELECT count (*) FROM user sequences WHERE sequence_name='ACCT_MANAGE_PRIV'. Additionally, in at least some embodiments, the following validation query can be created to validate DDL objects (e.g., PROCEDURES, PACKAGES, PACKAGEBODIES, FUNCTIONS): Select owner, object name, object_type,created, last_ddl_time from dba_objects where object_name in ('@ObjectName'). In this example, it is assumed that @ObjectName is the name of the object being executed and the last_ddl_time column shows the last execution time of that object.

Accordingly, one or more embodiments include a process to identify object characteristics of objects in the database scripts. In some embodiments, each database script is parsed to find constraint information (e.g., constraint names such as PRIMARY_KEY and FOREIGN_KEY) and where conditions are examined to find the column name conditions. SELECT queries can then be generated for each object type, and the condition to execute with the select query is created by parsing the code of the corresponding database script. In some embodiments, the validation scripts can be used to verify substantially all types of objects. For example, in PL/SQL (a procedural language designed for SQL), validation scripts can be created and used to verify a plurality of types of objects, including TABLES, PROCEDURES, VIEWS, PACKAGES, PACKAGEBODIES, FUNCTIONS, SEQUENCES, and LINKS.

Figure 9:
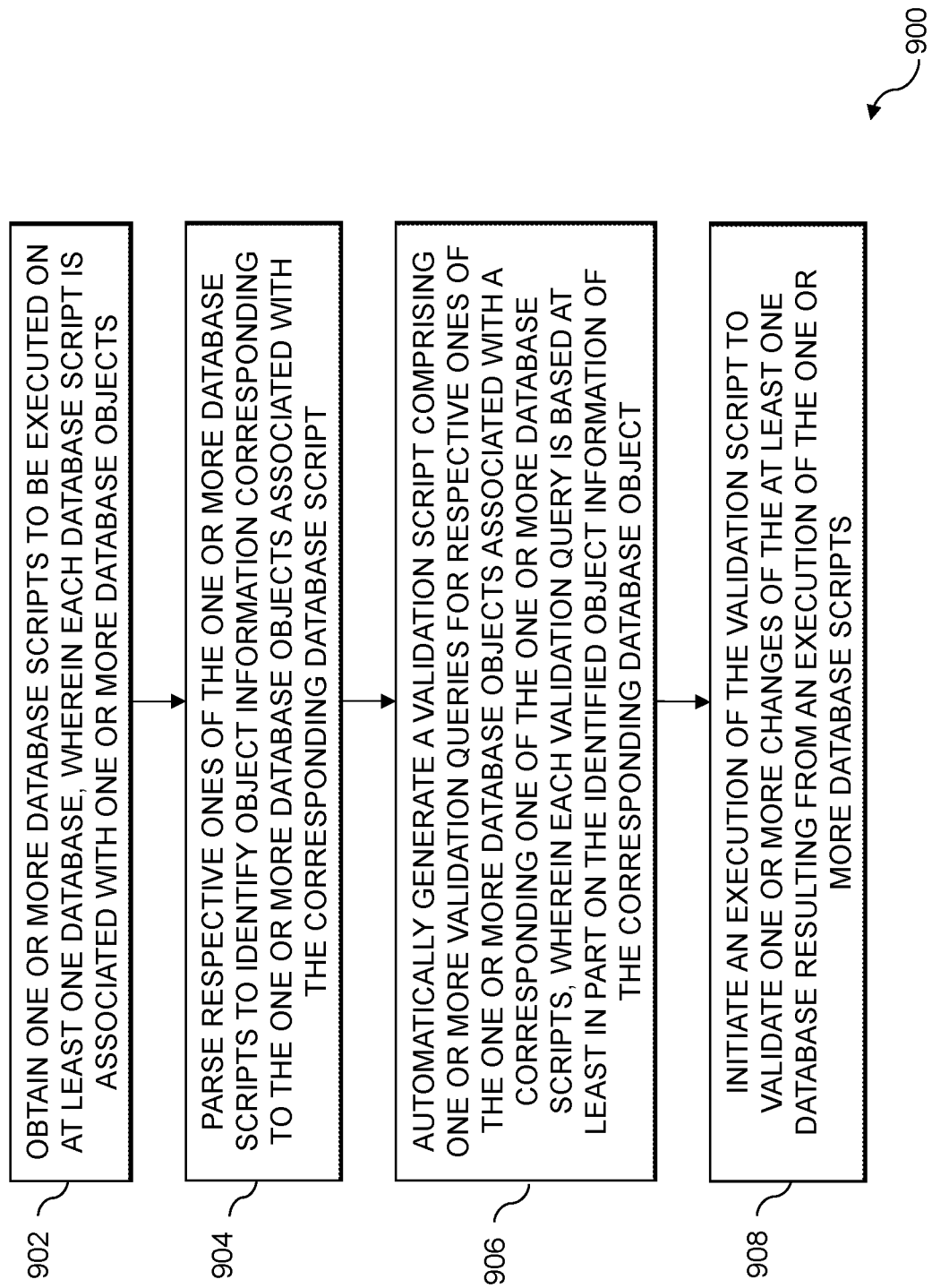
FIG. 9 shows a flow diagram of a process for automated validation of database deployments in an illustrative embodiment.

FIG. 9 is a flow diagram of a process 900 for automated validation of database deployments in an illustrative embodiment. It is to be understood that this particular process is only an example, and additional or alternative processes can be carried out in other embodiments.

In this embodiment, the process 900 includes steps 902 through 908. These steps are assumed to be performed by the deployment validation system 105 utilizing its elements 112, 114 and 116.

Step 902 includes obtaining one or more database scripts to be executed on at least one database, wherein each database script is associated with one or more database objects.

Step 904 includes parsing respective ones of the one or more database scripts to identify object information corresponding to the one or more database objects associated with the corresponding database script.

Step 906 includes automatically generating a validation script comprising one or more validation queries for respective ones of the one or more database objects associated with a corresponding one of the one or more database scripts, wherein each validation query is based at least in part on the identified object information of the corresponding database object.

Step 908 includes initiating an execution of the validation script to validate one or more changes of the at least one database resulting from an execution of the one or more database scripts.

The object information may include at least one of: one or more object types, one or more object names, and one or more object operations. The object operation of a given one of the database objects may include a create operation, and the one or more validation queries for the given one of the database objects may include: a select query and at least one object name corresponding to the given database object. The object operation of a given one of the database objects may include an insert operation, and the one or more validation queries for the given one of the database objects may include: a select query comprising a where clause that is based at least in part on one or more of: one or more dependencies associated with the insert operation and one or more conditions identified in the insert operation. The one or more dependencies may be determined in a recursive manner based on at least one of: one or more foreign keys and one or more primary keys. The object operation of a given one of the database objects may include an update operation, and the one or more validation queries for the given one of the database objects may include: a select query comprising a where clause that is based at least in part on one or more conditions associated with a where clause of the update operation. The parsing may be based at least in part on a set of keywords corresponding to a database scripting language. The generating the validation script may include appending each of the one or more validation queries for each of the database objects into a single file.

Accordingly, the particular processing operations and other functionality described in conjunction with the flow diagram of FIG. 9 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant technical solutions relative to conventional approaches. For example, some embodiments are configured to significantly reduce errors and/or downtime of applications resulting from database deployments.

These and other embodiments can effectively overcome technical problems associated with conventional techniques that rely on manually validating changes resulting from database deployments. For example, some embodiments are configured to parse database scripts prior to a database code deployment to automatically generate validation queries, which are then executed following the database deployment to verify changes made to a target database. These and other embodiments can improve user experience and effectively reduce conflicts and/or errors relative to conventional approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 10 and 11. Although described in the context of system 100, these platforms may also be used to implement at least portions of other information processing systems in other embodiments.

Figure 10:
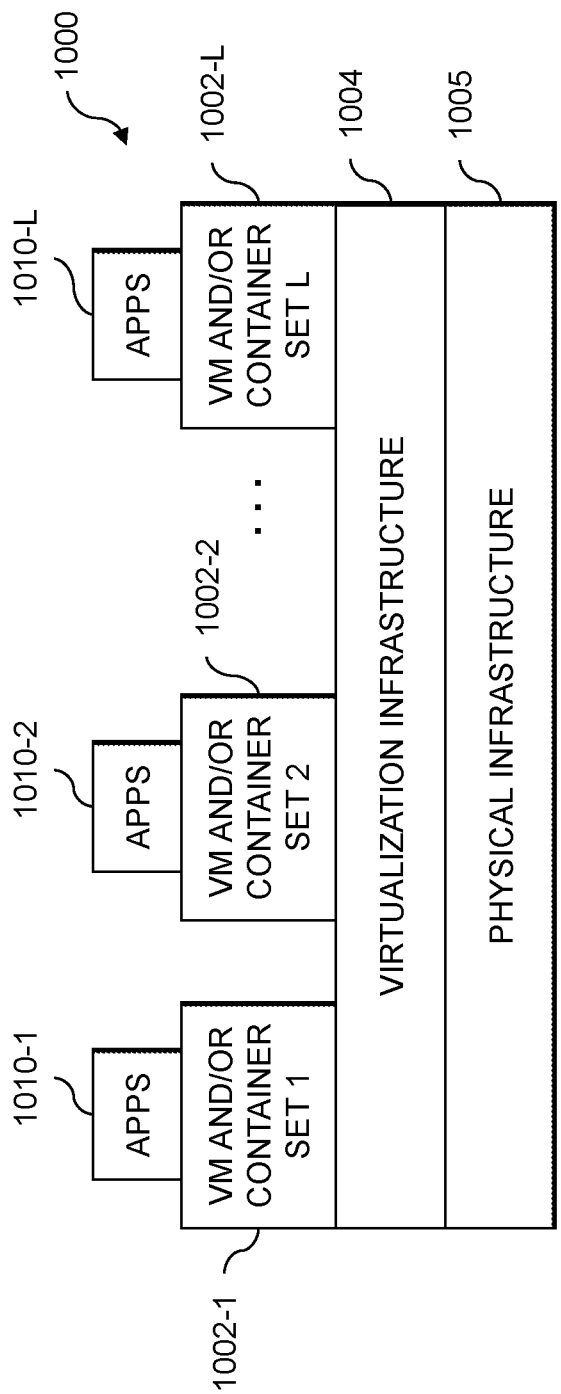
FIGS. 10 and 11 show examples of processing platforms that may be utilized to implement at least a portion of an information processing system in illustrative embodiments.
Figure 11:
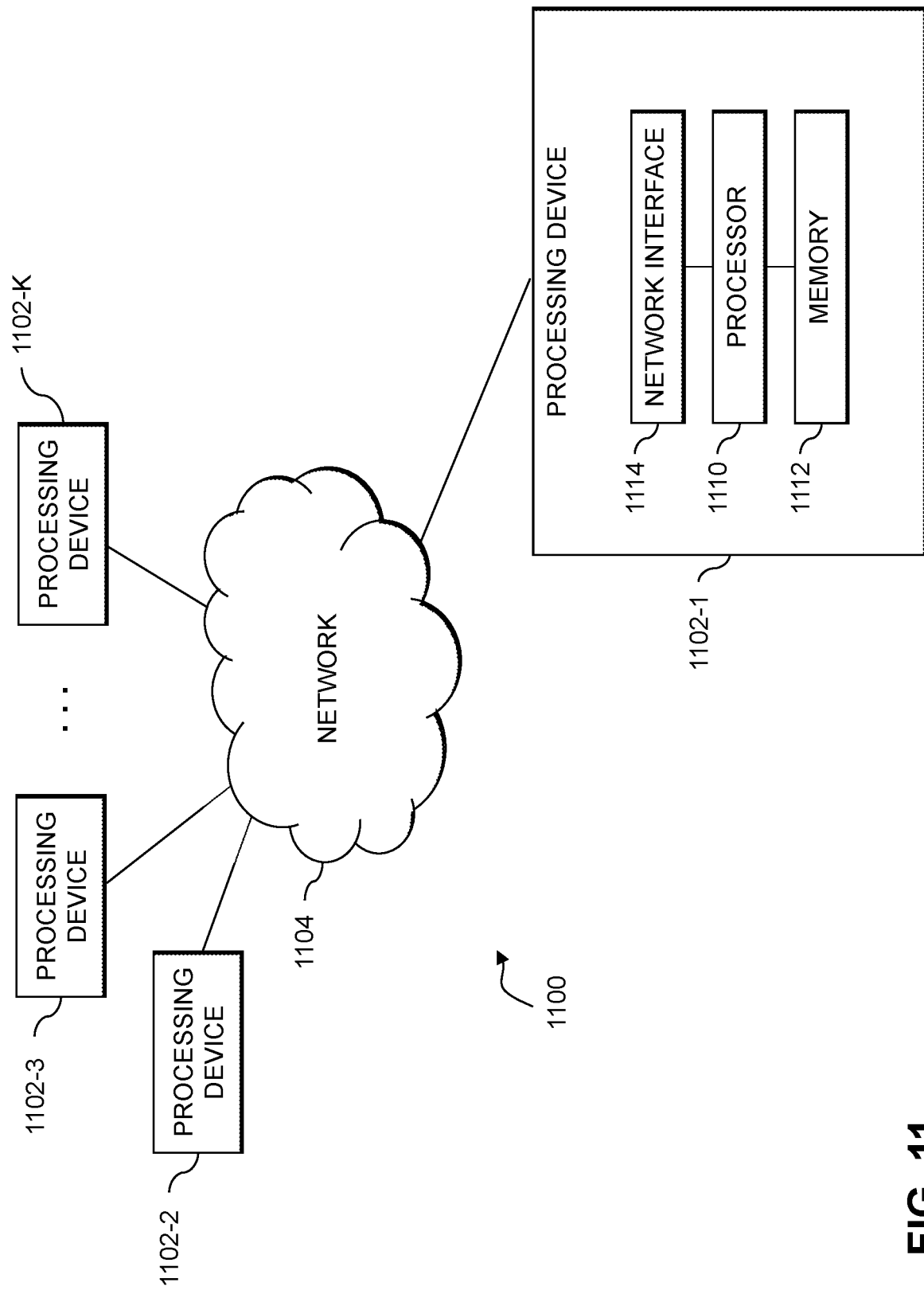

FIG. 10 shows an example processing platform comprising cloud infrastructure 1000. The cloud infrastructure 1000 comprises a combination of physical and virtual processing resources that are utilized to implement at least a portion of the information processing system 100. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 1000 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 comprise respective VMs, respective sets of one or more containers, or respective sets of one or more containers running in VMs. In some implementations of the FIG. 10 embodiment, the VMs/container sets 1002 comprise respective VMs implemented using virtualization infrastructure 1004 that comprises at least one hypervisor.

A hypervisor platform may be used to implement a hypervisor within the virtualization infrastructure 1004, wherein the hypervisor platform has an associated virtual infrastructure management system. The underlying physical machines comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1102-1 in the processing platform 1100 comprises a processor 1110 coupled to a memory 1112.

The processor 1110 comprises a microprocessor, a microcontroller, an ASIC, an FPGA or other type of processing circuitry, as well as portions or combinations of such circuitry elements.

The memory 1112 comprises RAM, ROM or other types of memory, in any combination.

The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments.

A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining one or more database scripts to be executed on at least one database, wherein each database script is associated with one or more database objects;
    parsing respective ones of the one or more database scripts to identify object information corresponding to the one or more database objects associated with the corresponding database script, wherein the object information comprises one or more object operations and one or more object names, and wherein the one or more object operations comprise at least one create operation corresponding to a given one of the one or more database objects;
    automatically generating one or more validation queries for respective ones of the one or more database objects associated with a corresponding one of the one or more database scripts, wherein each validation query is based at least in part on the identified object information of the corresponding database object, and wherein at least one of the validation queries is automatically generated by identifying at least one condition associated with at least one of the one or more object operations, and inserting the at least one condition into the at least one validation query, and wherein at least one of the one or more validation queries corresponding to the at least one create operation comprises a select query and at least one object name corresponding to the given one of the database objects;
    combining the generated one or more validation queries into a validation script; and
    initiating an execution of the validation script in response to an execution of the one or more database scripts, wherein the validation script validates one or more changes of the at least one database resulting from the execution of the one or more database scripts;
    wherein the method is performed by at least one processing device comprising a processor coupled to a memory.

2. The computer-implemented method of claim 1, wherein the object information further comprises one or more object types.

3. The computer-implemented method of claim 2, wherein an object operation of an additional one of the database objects comprises an insert operation, and wherein one or more validation queries for the additional one of the database objects comprise: a select query comprising a where clause that is based at least in part on one or more of: one or more dependencies associated with the insert operation and one or more conditions identified in the insert operation.

4. The computer-implemented method of claim 3, wherein the one or more dependencies are determined in a recursive manner based on at least one of: one or more foreign keys and one or more primary keys.

5. The computer-implemented method of claim 2, wherein an object operation of an additional one of the database objects comprises an update operation, and wherein one or more validation queries for the additional one of the database objects comprise: a select query comprising a where clause that is based at least in part on one or more conditions associated with a where clause of the update operation.

6. The computer-implemented method of claim 1, wherein the parsing is based at least in part on a set of keywords corresponding to a database scripting language.

7. A non-transitory processor-readable storage medium having stored therein program code of one or more software programs, wherein the program code when executed by at least one processing device causes the at least one processing device:
to obtain one or more database scripts to be executed on at least one database, wherein each database script is associated with one or more database objects;
to parse respective ones of the one or more database scripts to identify object information corresponding to the one or more database objects associated with the corresponding database script, wherein the object information comprises one or more object operations and one or more object names, and wherein the one or more object operations comprise at least one create operation corresponding to a given one of the one or more database objects;
to automatically generate one or more validation queries for respective ones of the one or more database objects associated with a corresponding one of the one or more database scripts, wherein each validation query is based at least in part on the identified object information of the corresponding database object, and wherein at least one of the validation queries is automatically generated by identifying at least one condition associated with at least one of the one or more object operations, and inserting the at least one condition into the at least one validation query, and wherein at least one of the one or more validation queries corresponding to the at least one create operation comprises a select query and at least one object name corresponding to the given one of the database objects;
to combine the generated one or more validation queries into a validation script; and
to initiate an execution of the validation script in response to an execution of the one or more database scripts, wherein the validation script validates one or more changes of the at least one database resulting from the execution of the one or more database scripts.

8. The non-transitory processor-readable storage medium of claim 7, wherein the object information further comprises one or more object types.

9. The non-transitory processor-readable storage medium of claim 8, object operation of an additional one of the database objects comprises an insert operation, and wherein the one or more validation queries for the additional one of the database objects comprises: a select query comprising a where clause that is based at least in part on one or more of: one or more dependencies associated with the insert operation and one or more conditions identified in the insert operation.

10. The non-transitory processor-readable storage medium of claim 8, wherein an object operation of an additional one of the database objects comprises an update operation, and wherein one or more validation queries for the additional one of the database objects comprise: a select query comprising a where clause that is based at least in part on one or more conditions associated with a where clause of the update operation.

11. The non-transitory processor-readable storage medium of claim 7, wherein the parsing is based at least in part on a set of keywords corresponding to a database scripting language.

12. An apparatus comprising:
at least one processing device comprising a processor coupled to a memory;
the at least one processing device being configured:
to obtain one or more database scripts to be executed on at least one database, wherein each database script is associated with one or more database objects;
to parse respective ones of the one or more database scripts to identify object information corresponding to the one or more database objects associated with the corresponding database script, wherein the object information comprises one or more object operations and one or more object names, and wherein the one or more object operations comprise at least one create operation corresponding to a given one of the one or more database objects;
to automatically generate one or more validation queries for respective ones of the one or more database objects associated with a corresponding one of the one or more database scripts, wherein each validation query is based at least in part on the identified object information of the corresponding database object, and wherein at least one of the validation queries is automatically generated by identifying at least one condition associated with at least one of the one or more object operations, and inserting the at least one condition into the at least one validation query, and wherein at least one of the one or more validation queries corresponding to the at least one create operation comprises a select query and at least one object name corresponding to the given one of the database objects;
to combine the generated one or more validation queries into a validation script; and
to initiate an execution of the validation script in response to an execution of the one or more database scripts, wherein the validation script validates one or more changes of the at least one database resulting from the execution of the one or more database scripts.

13. The apparatus of claim 12, wherein the object information further comprises one or more object types.

14. The apparatus of claim 13, object operation of an additional one of the database objects comprises an insert operation, and wherein the one or more validation queries for the additional one of the database objects comprises: a select query comprising a where clause that is based at least in part on one or more of: one or more dependencies associated with the insert operation and one or more conditions identified in the insert operation.

15. The apparatus of claim 13, wherein an object operation of an additional one of the database objects comprises an update operation, and wherein one or more validation queries for the additional one of the database objects comprise: a select query comprising a where clause that is based at least in part on one or more conditions associated with a where clause of the update operation.

16. The computer-implemented method of claim 2, wherein the object information further comprises:
an order of the one or more database objects.

17. The non-transitory processor-readable storage medium of claim 8, wherein the object information further comprises:
an order of the one or more database objects.

18. The apparatus of claim 12, wherein the parsing is based at least in part on a set of keywords corresponding to a database scripting language.

19. The apparatus of claim 14, wherein the one or more dependencies are determined in a recursive manner based on at least one of: one or more foreign keys and one or more primary keys.

20. The non-transitory processor-readable storage medium of claim 9, wherein the one or more dependencies are determined in a recursive manner based on at least one of: one or more foreign keys and one or more primary keys.

* * * * *